United States Patent [19]

Briche

[11] Patent Number: 4,526,156

[45] Date of Patent: Jul. 2, 1985

[54] AIR INTAKE FOR AN AIR FILTER OF AN INTERNAL COMBUSTION ENGINE

[75] Inventor: Paul Briche, Tourcoing, France

[73] Assignee: Aciers et Outillage Peugeot, Audincourt, France

[21] Appl. No.: 628,089

[22] Filed: Jul. 5, 1984

[30] Foreign Application Priority Data

Jul. 8, 1983 [FR] France .................. 83 11441

[51] Int. Cl.³ .................................. F02M 31/00
[52] U.S. Cl. .................. 123/552; 123/556; 236/13
[58] Field of Search .............. 123/552, 556; 236/101 C, 99 F, 13

[56] References Cited

U.S. PATENT DOCUMENTS

| | | | |
|---|---|---|---|
| 1,098,476 | 6/1914 | Carpenter | 123/556 |
| 3,450,119 | 6/1969 | Sendelbach | 123/552 |
| 3,801,078 | 4/1974 | Denton | 123/552 |
| 3,839,039 | 10/1974 | Obermaier | 123/552 |
| 3,974,808 | 8/1976 | Heitert | 123/552 |
| 3,989,186 | 11/1976 | McMichael | 236/101 C |
| 4,340,172 | 7/1982 | Poore | 123/552 |

Primary Examiner—Ronald H. Lazarus
Attorney, Agent, or Firm—Sughrue, Mion, Zinn, Macpeak and Seas

[57] ABSTRACT

The air intake neck comprises a body 1 in two semi-shells 1a, 1b which define a mixing chamber 2 onto which open a cold air conduit 3 and a hot air conduit 7 which communicate with an outlet conduit 12 for the mixed air mixed in the mixing chamber 2. The hot air conduit 7 is separated from the mixing chamber 2 by a thermostatically adjusted flap 9 which is controlled, through a linkage 21, 26, 27, by a thermometric sensor 17. The latter is connected to the body 1 and provided in a position in which the mixed air flows thereover. The linkage comprises transmission elements 21, 26, 27 which are exclusively mounted in translation in the body 1 and include at least one motion direction changing device 27.

9 Claims, 7 Drawing Figures

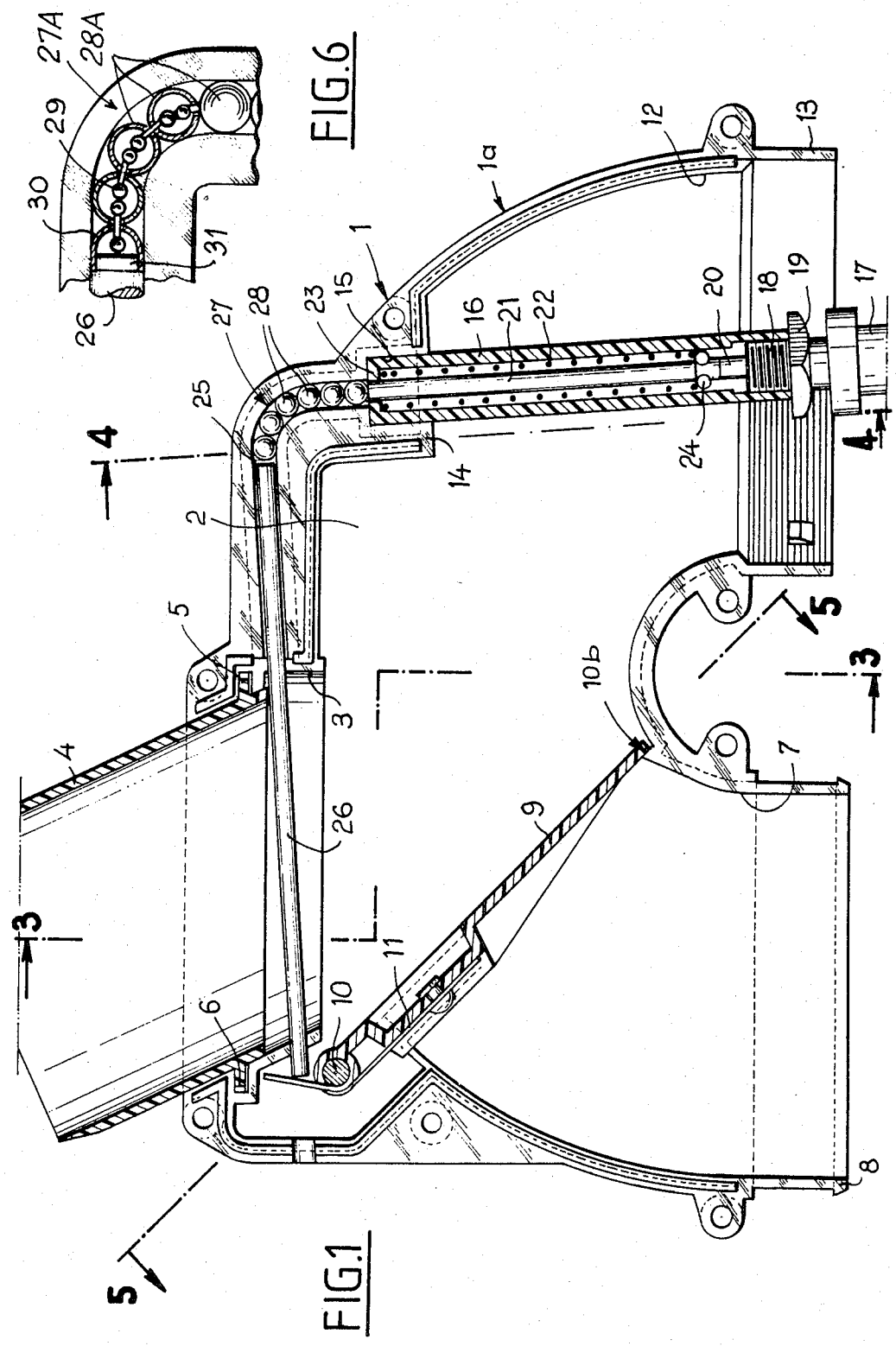

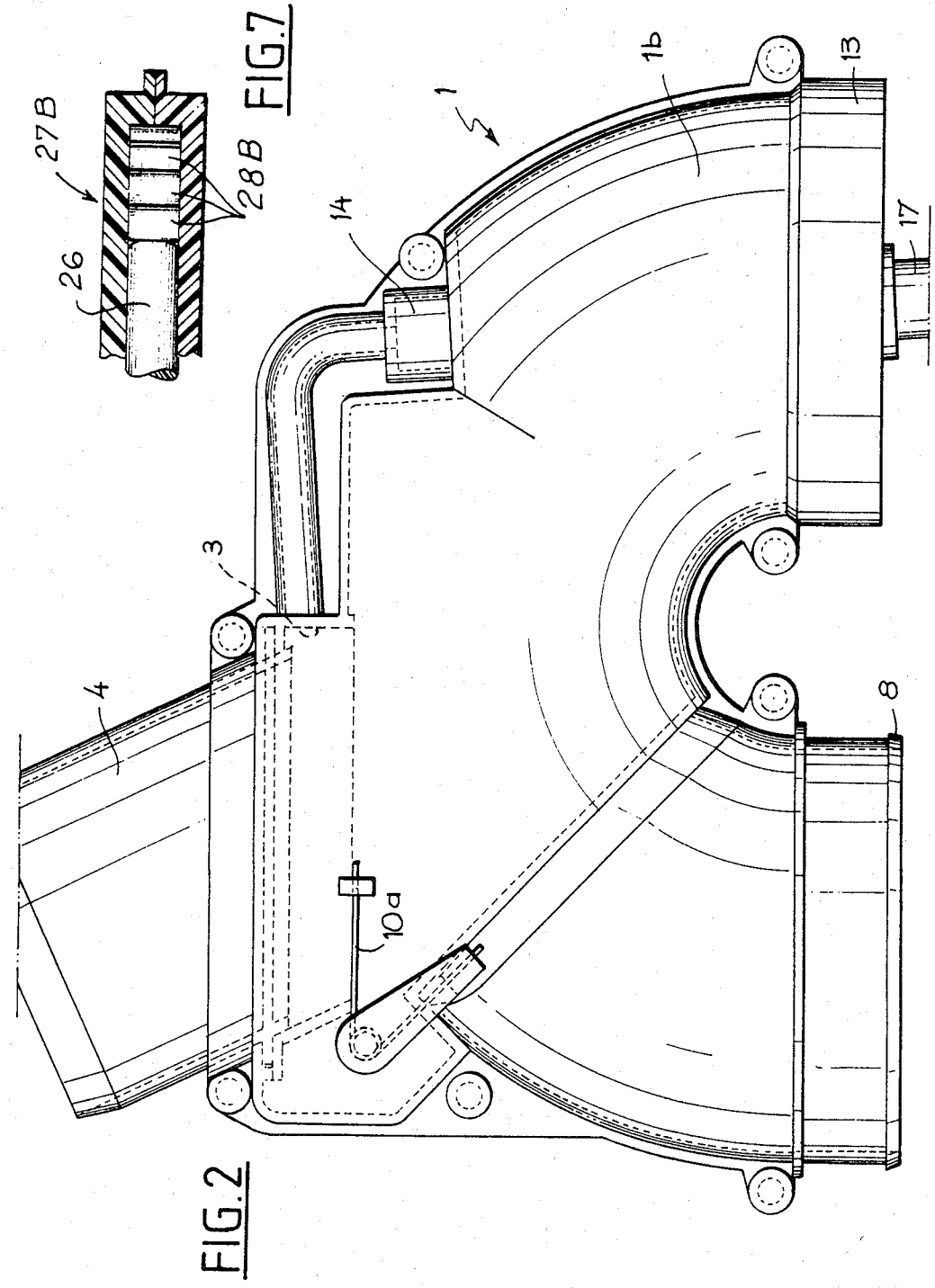

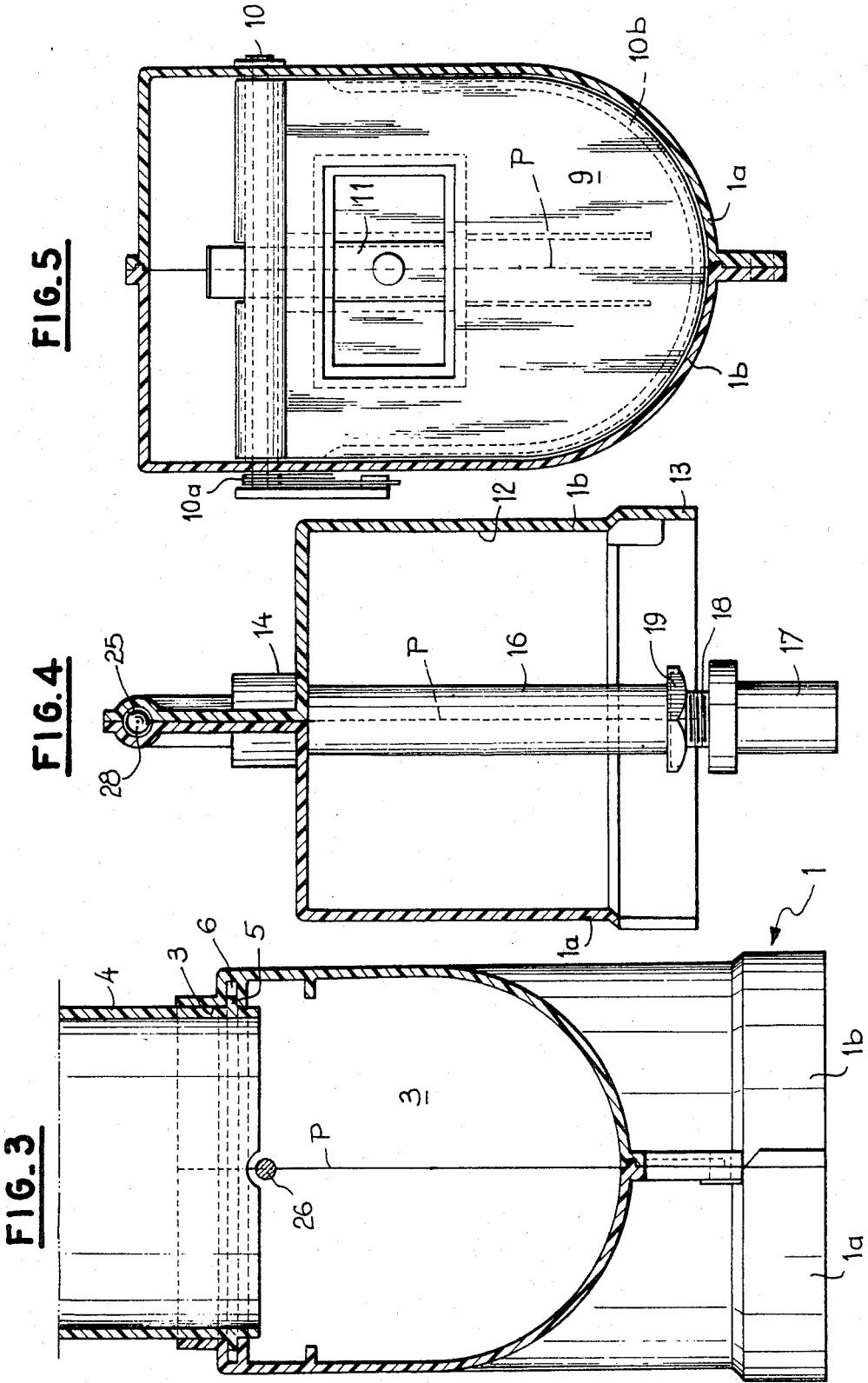

AIR INTAKE FOR AN AIR FILTER OF AN INTERNAL COMBUSTION ENGINE

The present invention relates to devices supplying air to internal combustion engines. More precisely, the invention concerns an air intake neck for the air filter of such an engine of the type comprising a body in two semi-shells which define a mixing chamber onto which open a cold air conduit and a hot air conduit, said conduits communicating with an outlet conduit for the mixed air mixed in said mixing chamber, the hot air conduit being separated from the mixing chamber by a thermostatically adjusted flap which is controlled, through a linkage, by a thermometric sensor connected to the body and provided in such position that said mixed air travels therealong.

In a known intake neck of this type, the linkage interposed between the flap and the thermometric sensor comprises a lever rotatively mounted in the body and coupling the output of the sensor to the flap through a push-rod. The thermometric sensor is then placed in the lateral wall of the body which defines the outlet conduit of the neck.

This arrangement has several drawbacks.

First, the mounting of the linkage presents problems and does not lend itself to an automatic mounting since the lever is mounted to rotate about a pin which usually extends in a direction perpendicular to the joint plane of the two semi-shells of the body. Further, owing to the fact that the thermometric sensor must be constantly biased in a resilient manner in a given direction, the linkage must include an adjusting element and, in the device of the prior art, this adjustment is effected by a screw which must be adjusted manually after the mounting of the linkage and the body of the neck. Further, the fact that this mounting is relatively complicated and results in a high cost, this adjustment precludes an automatic assembly of the neck.

An object of the invention is to overcome these drawbacks and for this purpose provides an intake neck of the type indicated hereinbefore in which the linkage comprises transmission elements mounted exclusively in translation in the body and including at least one motion direction changing means.

Owing to this feature, the linkage can be advantageously easily and automatically mounted in one of the semi-shells, merely by placing it therein, no rotatively mounted element being provided. In particular, this linkage requires no pin which is mounted to be perpendicular to the joint plane of the semi-shells. Further, an adjustment of the linkage becomes superfluous.

A better understanding of the invention will be had from the following description of one embodiment which is given solely by way of example with reference to the accompanying drawings in which:

FIG. 1 is a view in section taken in the joint plane of the semi-shells of the intake neck body, showing in particular the arrangement of the linkage and the thermometric sensor;

FIG. 2 is an elevational view of the neck;

FIGS. 3, 4 and 5 are sectional views taken respectively on lines 3—3, 4—4 and 5—5 of FIG. 1;

FIG. 6 is a detail view to an enlarged scale showing a modification of the direction changing means which may be used in the intake neck according to the invention;

FIG. 7 is a view similar to FIG. 6, but showing another modification of the direction changing means.

According to the embodiment shown in FIGS. 1 to 5, the intake neck according to the invention comprises a body 1 consisting of two semi-shells 1a and 1b which are interconnected in a joint plane P (FIGS. 3 to 5). The semi-shells 1a and 1b are preferably made from a moulded plastics material and may advantageously have an identical shape. The body 1, which has roughly a crescent shape, defines a mixing chamber 2 onto which opens a first intake conduit 3 with which communicates a connecting pipe 4 fixed to the body by a flange 5 engaged in an annular groove 6 in the lateral wall of the intake conduit 3.

A second intake conduit 7 for hot air also opens onto the mixing chamber and includes at its outer end a connecting flange 8 to which may be connected a pipe (not shown) for supplying hot air to the intake neck. The hot air intake conduit 7 is separated from the mixing chamber by a thermostatically adjusted flap 9 which is mounted to pivot about a pivot pin 10 received in the body 1 and having its axis extending in a direction perpendicular to the joint plane P of the semi-shells 1a and 1b.

This flap is biased to its closing position by a spring 10a provided outside the body 1 and bears against a seat 10b formed in this body in the transition region between the intake 7 and the mixing chamber 2.

The flap 8 is provided with an actuating tab 11 which extends in the opposite direction relative to the flap 9 from the pivot pin 10.

The mixing chamber 2 also communicates with an outlet conduit 12 for the mixed air mixed in said chamber. This outlet conduit terminates in an annular connection 13 which is adapted to be mounted on the intake of an air filter for supplying regulated air to the latter. This filter has not been shown in the drawings.

Note that the air intake conduit opens onto the mixing chamber 2 roughly at the apex or top of the crescent shape defined by the body 1 and that the flap 9 extends in a direction roughly parallel to the direction of flow of the cold air entering the mixing chamber. This arrangement has the advantage of opposing only a slight resistance to the main air stream flowing in the intake neck.

A support means 14 is provided in the body 1 in front of the axis of the outlet conduit 12. This support means defines a cylindrical cavity 15 in which is received a cylindrical tube 16 connected to the body by a drive fit or an adhesive, for example.

This cylindrical tube extends in a cantilever manner toward the outlet conduit 12 and carries at its free end a thermometric sensor 17 which is fixed therein by means of a screwthread 18 and a tightening lock-nut 19.

The sensor comprises an output push-rod 20 (FIG. 1) which is in contact with a first transmission rod 21 mounted coaxially in the tube 16 and surrounded by a compression spring 22 which bears against a flange 23 formed at the end of the tube 16 engaged in the cavity 15 and against a shoulder 24 disposed around the push-rod 21 adjacent the thermometric sensor 17. This shoulder may be formed by a ring as shown in FIG. 1 or by a swaging of the end portion of the rod 21.

Each semi-shell 1a and 1b has a curved groove 25, the two grooves forming, after assembly of the two semi-shells, a passageway of circular cross-sectional shape which extends the cavity 15 and is adapted to receive one of the ends of a second transmission rod 26 and a direction changing means 27 which changes the direction of motion of the linkage by about 90°.

The opposite end of the transmission rod 26 is in direct contact with the actuating tab 11 of the flap 9.

The direction changing means 27 may be formed by a set of balls 28 as shown in the Figures or by any other like arrangement. Two modifications of this direction changing means will be described hereinafter with reference to FIGS. 6 and 7.

The thermometric sensor 17, which is placed in the outlet conduit of the intake neck, is exposed to the air issuing from the mixing chamber 2. As it is placed on the axis of the outlet conduit 12, this sensor measures with fidelity the temperature of the air in this region and its push-rod 20 therefore reacts exactly as a function of the temperature of this air. As the push-rod 20 is in direct contact with the linkage formed by the rods 21 and 26 and by the motion direction changing means 27, the movements of this push-rod are directly transferred to the actuating tab 11 of the flap 9 so that the latter reacts immediately to variations in the temperature of the air issuing from the neck. For example, when cold air enters the mixing chamber 2, the thermometric sensor urges its push-rod outwardly so that the rods 21 and 26 move in translation and tend to open the flap 9.

It is known that a thermometric sensor of the type used in intake necks of the considered type, requires the permanent application of a resiliently yieldable biasing force in a direction tending to return its push-rod inwardly of the sensor.

In the arrangement according to the invention, this is achieved suitably by the spring 22 which bears directly against the shoulder 24 of the rod 21.

As the spring 21 may be calculated exactly in accordance with the nature of the thermometric sensor 17 and the length of the tube 16, it can be arranged that no adjustment be necessary in the course of the assembly of the intake neck so that no manual operation is required during manufacture. However, an adjustment is possible by screwing to a variable extent the sensor 17 in the tube 16 and by locking it in position with the lock-nut 19.

Note also that the presence of the motion direction changing means 27 in the linkage connecting the flap to the sensor enables the arrangement according to the invention to be employed in intake necks whose configuration is not that shown in the Figures. This is a considerable advantage bearing in mind the fact that an air intake neck of a carburettor may have very diverse shapes depending on the placement of the motor unit in an automobile vehicle, the arrangement according to the invention being universal as concerns the transmission of the force from the sensor to the adjusting flap. Further, it will be observed that all the mechanical elements of the structure are disposed in the joint plane P of the semi-shells 1a and 1b, which considerably facilitates the assembly.

FIG. 6 shows a modification of the invention to a scale which is larger than that of FIGS. 1 to 5. This modification concerns a motion direction changing means 27A whose elements are formed by spheres 28A of press-formed sheet metal interconnected by connecting links 29 in the manner of the chains used in sanitary equipment for connecting the drain stopper to the equipment. The end elements 30 of this type of motion direction changing means terminate in an annular cylindrical portion for fitting onto a reduced portion 31 of the rods 21 and 26 respectively. Thus, upon assembly, these rods and the motion direction changing means constitute a single unit which markedly facilitates the positioning so that the assembly may be entirely automatic. In a general way, the motion direction changing elements are advantageously connected to one another for this same purpose. This may be achieved by means other than those described hereinbefore.

For example, FIG. 7 shows another modification of the invention in which the motion direction changing means 27B comprises small cylindrical rollers 28B. The latter may be interconnected by a kind of conventional roller chain. In this case, the passageway defined by the grooves 25 has a rectangular cross-sectional shape.

What is claimed is:

1. An air intake neck for an air filter of an internal combustion engine, said neck comprising a body having two semi-shells which are interconnected in a joint plane and define a mixing chamber, a cold air conduit and a hot air conduit both opening onto said chamber, an outlet conduit for the mixed air mixed in said mixing chamber and communicating with said hot air and cold air conduits, a thermostatically adjustable flap which is capable of separating the hot air conduit from the mixing chamber, a flap-actuating tab connected to the flap, a thermometric sensor connected to the body and located in a position in which said mixed air travels thereover and incuding a movable output element, and a linkage connecting the sensor to the flap for controlling the position of the flap, the linkage comprising a first transmission rod in contact with said movable output element of the thermometric sensor, a second rod in contact with the actuating tab of said flap, and motion direction changing means comprising elements permitting a transmission of force from the output element to the actuating tab with a modification in the direction of said force, said first transmission rod, said second transmission rod and said motion direction changing means being mounted to be movable exclusively in translation in said body and at least one of said transmission rods being slidably mounted in said plane of said body.

2. A neck according to claim 1, wherein the motion direction changing means has component elements which are disposed in a passageway formed in said body in said joint plane of the semi-shells.

3. A neck according to claim 2, wherein said elements of the motion direction changing means are balls.

4. A neck according to claim 2, wherein said elements of the motion direction changing means are cylindrical rollers.

5. A neck according to claim 2, wherein the elements of the motion direction changing means are connected to one another.

6. A neck according to claim 5, wherein the elements of the motion direction changing means are formed by spheres of press-formed sheet metal which are interconnected by connecting links, end elements of the motion direction changing means being connected to said rods.

7. A neck according to claim 1, comprising a support tube which is fixed in a cantilever manner in said body, surrounds and is coaxial with said first rod and extends in said outlet conduit substantially along the axis of said outlet conduit and carries at its free end said thermometric sensor.

8. A neck according to claim 7, wherein a spring is disposed in said support tube for exerting on the movable output element of the sensor a resiliently yieldable force through the first rod.

9. A neck according to claim 1, wherein said body has substantially the shape of a crescent having end portions shaped in such manner as to form said hot air intake conduit and said mixed air outlet conduit, said cold air conduit opening onto the mixing chamber substantially at an apex of the crescent-shaped body, said flap extending roughly in a direction parallel to the general direction of flow of the cold air entering said mixing chamber and said motion direction changing means effecting a change in direction of an angle of about 90°.

* * * * *